United States Patent [19]

Furudate

[11] Patent Number: 4,634,830
[45] Date of Patent: Jan. 6, 1987

[54] METHOD OF CONTROLLING CONSTANT-CURRENT FOR RESISTANCE WELDING MACHINES

[75] Inventor: Masato Furudate, Kanagawa, Japan

[73] Assignee: Dengensha Manufacturing Company Limited, Japan

[21] Appl. No.: 799,685

[22] Filed: Nov. 19, 1985

[30] Foreign Application Priority Data

Nov. 19, 1984 [JP] Japan .................. 59-244288

[51] Int. Cl.[4] ............................. B23K 11/24
[52] U.S. Cl. ...................... 219/117.1; 219/110
[58] Field of Search ............ 219/110, 109, 108, 117.1

[56] References Cited

U.S. PATENT DOCUMENTS 4,465,918 8/1984 Kiriyama et al. ............ 219/110
4,493,040 1/1985 Vanderhelst ................ 219/110

*Primary Examiner*—Clifford C. Shaw
*Attorney, Agent, or Firm*—Sughrue, Mion, Zinn, Macpeak and Seas

[57] ABSTRACT

A method of controlling constant-current for resistance welding machines comprising the steps of: detecting the welding current flowing into the primary coil or the secondary coil of a welding transformer, applying a first half-wave current having a predetermined first phase control angle, detecting the current value and the current conduction angle at that time, calculating a power factor angle of the resistance welding machine from the detected conduction angle and the phase control angle, calculating a second phase control angle, by which a current value corresponding to a previously set value of the next half-wave of current is obtained, from the calculated power factor angle, the detected conduction angle and the detected of current value, applying the next half-wave current at the second phase control angle through a thyristor circuit to a work to be welded, and repeating the above control operation during an entire welding cycle.

3 Claims, 3 Drawing Figures

FIG. 2
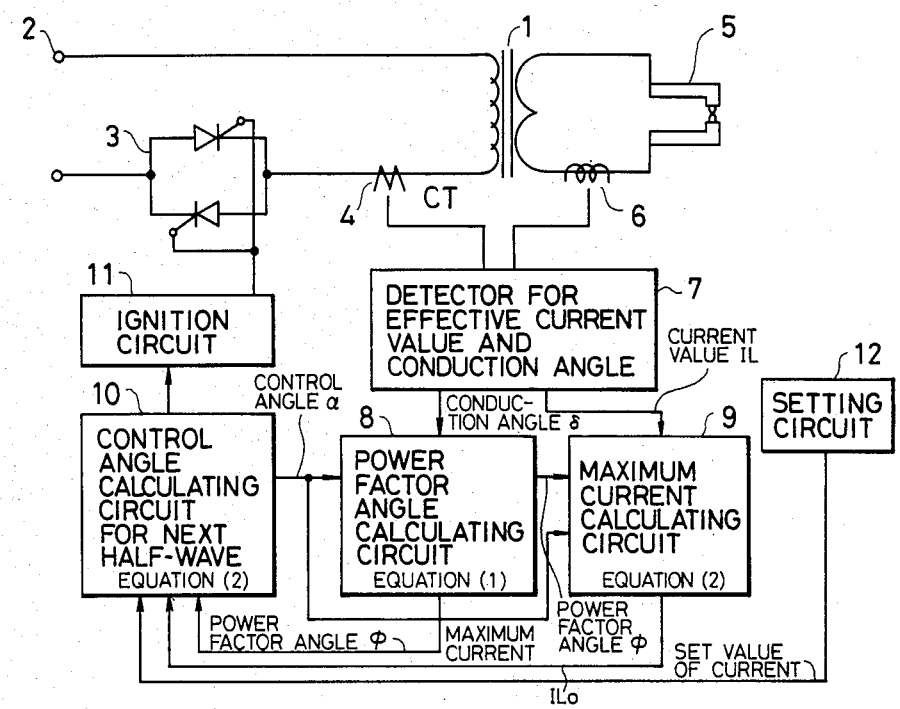
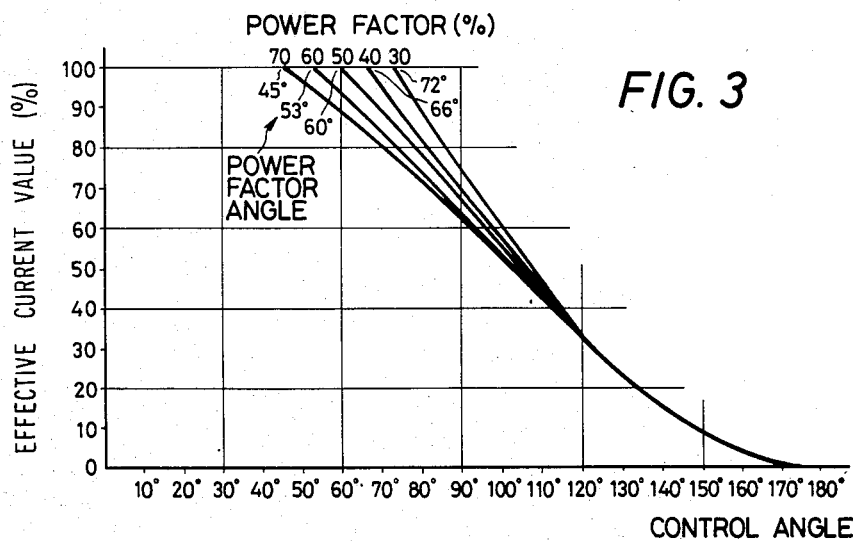
FIG. 3

METHOD OF CONTROLLING CONSTANT-CURRENT FOR RESISTANCE WELDING MACHINES

BACKGROUND OF THE INVENTION

The present invention relates to a constant-current controlling method for resistance welding machines, and more particularly to a constant-current controlling method having high precision, as compared with a conventional one, with respect to load variations during a welding operation, especially a power factor variation.

In a conventional method of controlling constant-current for resistance welding machines, the welding current is controlled in such a manner that a first half-wave of a welding current or a second half-wave current is initiated or started by setting a phase control or firing angle of about 90°–120°, and the power factor of the welding machine is calculated by detecting the current magnitude and the conduction angle in the first or second half-wave, and then the next phase controlling or firing angle is calculated by using the calculated power factor and the difference between the detected current magnitude and a previously set current magnitude thereby to fire a switching element by using the calculated phase controlling or firing angle.

According to the conventional controlling method, however, there were the following disadvantages. 1. The load power factor during the welding operation cannot be compensated, which results in an insufficient precision of response. 2. A comparatively large current is applied to the work to be welded at a conduction starting period, so that dust may sometimes be attached to the welding portion thereby causing deterioration of welding quality. 3. The power factor is calculated from the conduction angle at an unstable condition of the melting of the work in the conduction starting period, so that the power factor is not very accurate and it is not possible to attain a constant-current control with high precision.

SUMMARY OF THE INVENTION

An object of the present invention is to present a method of controlling constant-current for resistance welding machines, with high precision in response and high welding quality, even if ignition is conducted under the condition of a control or firing angle of 120° or more for the first or second half-wave at the welding current conduction starting period. The present invention is achieved on the basis of the point of view that the reason why a comparatively large current at the conduction starting period is required in the conventional method, results from the fact that in the case where the power factor is calculated from the conduction angle at a phase control angle (delayed phase) of 120° or more, the change of the power factor angle corresponding to the change of conduction angle is small thereby reducing the detection precision.

More specifically, it is a feature of the present invention that the constant current of the welding machine is controlled in such a manner that, in a method of controlling constant-current with a feedback loop for firing a switching element so as to minimize the difference between the value of current flowing into the primary coil or the secondary coil of a welding transformer and a set value of the welding current, a first half-wave of the welding current is applied to the work to be welded with a delayed phase, i.e., a phase control or firing angle $\alpha$ of 120°–150°, the actual current value $I_L$ and the current conduction angle $\delta$ being detected, then the power factor angle $\phi$ of the resistance welding machine being calculated from the detected conduction angle $\delta$ and the phase control or firing angle $\alpha$, and then the next phase control or firing angle $\alpha$ being calculated from the calculated power factor angle $\phi$ and the detected conduction angle and current value $I_L$ so as to obtain a current value corresponding to the next set value of current for the next half-wave, and the calculated value of the next phase control angle $\alpha$ being used for firing the switching element for the next half-wave; thus the phase control angle $\alpha$ of a next half-wave current is calculated on the basis of the previous data with respect to the phase or firing control angle $\alpha$, the current conduction angle $\delta$ and the welding current $I_L$ of the previous half-wave current, and such control procedure is repeated during an entire welding cycle.

BRIEF DESCRIPTION OF THE DRAWINGS

The above and other objects, features and advantages of the present invention will be more clear from the following description with reference to the accompanying drawings, in which:

FIG. 2 is a block diagram showing an embodiment of a control apparatus implementing the method of the present invention, and FIG. 3 is a graph showing the relationship between phase control or firing angle and a value of current in which the equation (2) on page 6 is represented as a percentage of maximum available current in the case of no control ignition.

DESCRIPTION OF THE PREFERRED EMBODIMENTS

Figure 1:
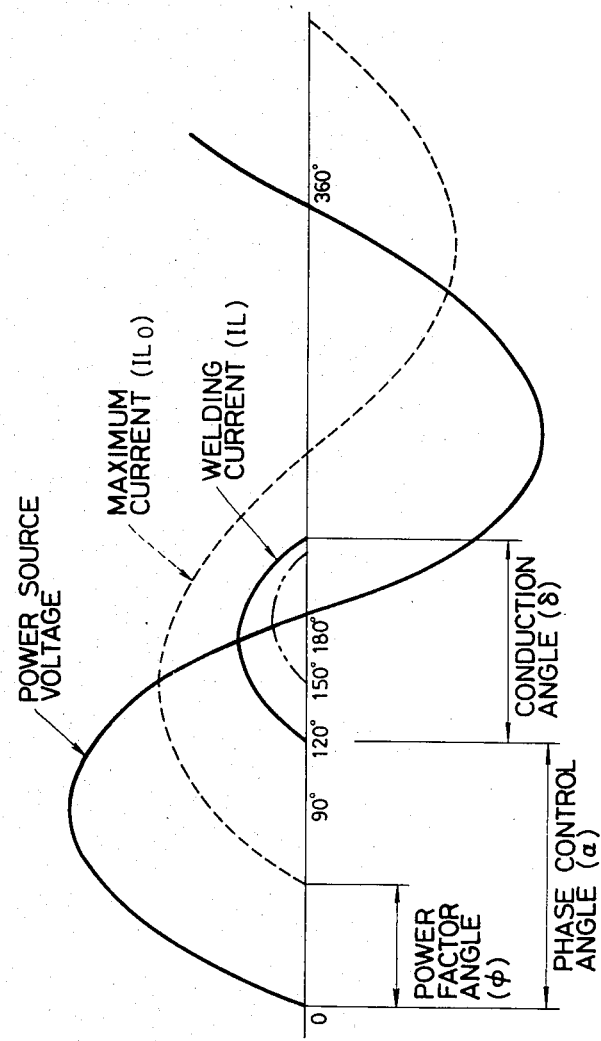
FIG. 1 shows waveforms of the voltage of an electric power source and a welding current, for explaining the present invention.

An embodiment of the present invention will now be described with reference to the drawings.

FIG. 2 is a block diagram showing one example of a control apparatus embodying the method of the present invention. In FIG. 2, there are provided a welding transformer 1, an A.C. electric power source input terminal 2, and an electronic switching element 3 such as a thyristor circuit arranged between the welding transformer 1 and the electric power source terminal 2. The welding current is detected from the current flowing in the primary coil or secondary coil of the transformer 1, and the primary coil current is detected by a current detector 4 (CT) disposed between the thyristor 3 and the transformer 1, and the secondary coil current is detected by a toroidal coil 6 disposed between the transformer 1 and a welding gun 5.

The output signal from the current detector 4 or the toroidal coil 6 is applied to a detector 7 for detecting an effective current value $I_L$ and a conduction angle $\delta$. The output signal of the conduction angle detected by the detector 7 is applied to a power factor angle calculating circuit 8, and, on the other hand, the output signal of the effective current value $I_L$ detected by the detector 7 is applied to a maximum current calculating circuit 9. The power factor calculating circuit 8 is provided between the maximum current calculating circuit 9 and a control or firing angle calculating circuit 10 which calculates the control or firing angle of the next half-wave current. The power factor angle $\phi$ of the welding machine can be calculated from the following equation (1) by using the first phase control or firing angle $\alpha$ with a delayed phase of 120°–150° to be used for the first half-wave current, which angle $\alpha$ was previously stored in the control angle calculating circuit 10 for next half-wave, and the conduction angle $\delta$ detected by the detector 7.

$$\tan(\pi - \alpha + \phi) = \frac{\sin \delta}{\cos \delta - \epsilon^{-\delta \cot \phi}} \quad (1)$$

The maximum current calculating circuit 9 calculates the maximum current value $I_{LO}$ in the case of non-control ignition from the current value $I_L$ detected by the detector 7, the power factor angle $\phi$ obtained by the equation (1), and the ignition control or firing angle $\alpha$ by using the following equation (2).

$$I_L = I_{LO} \sqrt{\frac{\delta}{\pi} - \frac{\sin \delta}{\pi} \cdot \frac{\cos(2\alpha + \phi + \delta)}{\cos \phi}} \quad (2)$$

The control angle calculating circuit for the next half-wave 10 is provided between an ignition or firing control circuit 11 connected to the thyristor circuit 3 and a current setting circuit 12, and the circuit 10 is provided with the set value of current for next half-wave stored in the circuit 12, and the circuit 10 calculates the phase control angle $\alpha$ by which the current value corresponding to the set value of current is obtained.

The ignition or firing circuit 11 controls the thyristor circuit 3 by receiving the phase control or firing angle $\alpha$ calculated by the calculating circuit 10.

In the controlling apparatus thus constructed, a set value of current for each half-wave is previously stored in the setting circuit 12, before the start of conduction. In general, the value for each half-wave is constant during all conduction time, and at most two half-waves are used. However, up-slope of about three cycles (six half-waves) are frequently used to ensure the melting of the work for the beginning of conduction. In this case, the first half-wave is started with a current of 10%–35% of the maximum available current value $I_{LO}$, and with a phase control angle of 150°–120°.

When an external welding starting signal is applied, the first half-wave current with a phase control or firing of angle 150°–120° is applied to the work. In this case, the welding current is 10%–35% of the maximum current $I_{LO}$ in the case of no control ignition, if the power factor angle of the generally used welding machine is 45°–70°. That is, the present invention is effective in preventing an abrupt flow of current into the welding transformer by the conduction of large current and the attachment of dust to the work at the beginning of melting. If the phase control angle is greater than 150°, it is difficult to ensure the firing of the thyristors 3. Therefore, the initial value of current can hardly be decreased any more. According to the present invention, as is apparent from FIG. 3, the the firing or phase control is made within the region in which the effective current value is not affected very much by the change of the power factor angle of the welding machine (in general, about 45°–70°), and is started with the comparatively small current of 10%–35% of the maximum available current $I_{LO}$ (in the case of no control ignition), so that the above-mentioned attachment of dust and the like can be eliminated.

The effective current value $I_L$ and the conduction angle $\delta$ during the conduction of the welding current are detected by the detector 7 by receiving the output signal from the current detector 4 disposed at the primary coil side of the transformer 1 or the toroidal coil 6 disposed at the secondary coil side of the transformer 1.

The detected conduction angle $\delta$ from the detector 7 is applied to the power factor angle calculating circuit 8, and the circuit 8 calculates the power factor angle $\phi$ from the received conduction angle $\delta$ and the ignition control or firing angle $\alpha$ by using the equation (1). The calculating operation is actually made in such a manner that many power factors $\phi$ are previously calculated and the calculated values are previously stored in a suitable memory as a data table, and the power factor or firing angle is fetched by setting the phase control angle $\alpha$ and the conduction angle $\delta$ as parameters. This manner is very effective to reduce the calculating time.

On the other hand, when the current value $I_L$ detected by the detector 7 is inputted into the maximum current calculating circuit 9, the maximum available current value $I_{LO}$ (in the case of no control ignition) is calculated by the circuit 9 from the phase control or firing angle $\alpha$ outputted from the calculating circuit 10 and by the power factor angle $\phi$ calculated by the circuit 8, by using the equation (2). The above-mentioned data table manner is effectively applicable also to the calculating operation of the circuit 9 to reduce the calculating time.

The output signals, i.e., the power factor angle $\phi$ and the maximum current value $I_{LO}$ obtained from the calculating circuits 8 and 9, are applied to the circuit 10. The circuit 10 calculates the control or firing angle $\alpha$ from the two signals, and from a set value of current for the next half-wave as stored in the setting circuit 12, by using the equation (2), as the set value is obtained. The above-mentioned data table manner is effectively applicable also to the calculating operation of the circuit 10 to reduce the calculating time.

By the control or firing angle outputted from the circuit 10, the ignition or firing circuit 11 is actuated to fire the thyristers in thyristor circuit 3. The above-mentioned control operation is repeated over the entire welding time.

As is apparent from the above-mentioned explanation, the present invention has the following advantages.

(1) In a welding machine using a large current flowing through a thyristor, the first half-wave of the welding current is delayed by a phase control or firing angle of 120°–150°, so that there is no necessity to provide a large current (60%–70% of the maximum current) at the start of conduction (of the first half-wave or the next half-wave), therefore the attachment of dust by which the welding quality is reduced, can be eliminated.

(2) As is apparent from FIG. 3, the power factor related to the change of ignition or firing angle against the error component of the effective current value, namely response gain, therefore a change of load power factor may be compensated during welding in comparison with the conventional method of constant-current control, thereby increasing the precision of response for the present invention.

(3) According to the present invention, the power factor angle at the time that the melting of the work is still unstable at the start of conduction, is not used during the entire welding time; therefore the precision of the power factor angle per se becomes high and a complete control of constant-current can be achieved.

Although the present invention has been described in its preferred form with a certain degree of particularity, it is understood that the present disclosure of the preferred form has been changed in the details of construction, and the combination and arrangement of parts may be modified without departing from the spirit and the scope of the present invention as hereinafter claimed.

I claim:

1. A method of controlling constant-current for a resistance welding machine, comprising the steps of: detecting the current flowing into the primary coil or the secondary coil of a welding transformer; applying a first half-wave of current having a predetermined first phase control angle of approximately 120° to 150°; detecting the magnitude of current and the current conduction angle during said first half-wave; calculating a power factor angle of said resistance welding machine from said detected conduction angle and said first phase control angle; calculating a second phase control angle, by which a value of current corresponding to a previously set value of the next half-wave of current is obtained, from said calculated power factor angle, said detected conduction angle and said detected current value; and applying said next half-wave of current at said second phase control angle through a thyristor circuit to a work to be welded.

2. A method of controlling constant-current according to claim 1, further comprising a step of: calculating available welding maximum current value in the case of no control ignition, said maximum current value being used to calculate said second phase control angle.

3. A method of controlling constant-current according to claim 2, wherein said previously set value of the next half-wave of current is used to calculate said second phase control angle.

* * * * *